(12) United States Patent
Zepp et al.

(10) Patent No.: US 6,943,478 B2
(45) Date of Patent: Sep. 13, 2005

(54) BRUSHLESS PERMANENT MAGNET WHEEL MOTOR WITH VARIABLE AXIAL ROTOR/STATOR ALIGNMENT

(75) Inventors: Lawrence P. Zepp, Fort Wayne, IN (US); Jerry W. Medlin, Fort Wayne, IN (US)

(73) Assignee: Dura-Trac Motors, Inc., Fort Wayne, IN (US)

( * ) Notice: Subject to any disclaimer, the term of this patent is extended or adjusted under 35 U.S.C. 154(b) by 0 days.

(21) Appl. No.: 10/714,313

(22) Filed: Nov. 14, 2003

(65) Prior Publication Data

US 2005/0104469 A1 May 19, 2005

(51) Int. Cl.⁷ .............................................. H02K 1/00
(52) U.S. Cl. ..................................... 310/191; 310/75 C
(58) Field of Search ................................ 310/75 C, 89, 310/91, 191, 254, 261

(56) References Cited

U.S. PATENT DOCUMENTS

| | | |
|---|---|---|
| 645,247 A | 3/1900 | Cantano |
| 829,975 A | 9/1906 | Lincoln |
| 1,194,645 A | 8/1916 | Lincoln |
| 2,153,563 A | 4/1939 | Hubacker |
| 2,348,053 A | 5/1944 | Bowker |
| 2,445,986 A | 7/1948 | Adamson |
| 2,484,197 A | 10/1949 | Veldhuis |
| 3,250,976 A | 5/1966 | Mcentire |
| 3,394,295 A | 7/1968 | Cory |
| 3,401,290 A | 9/1968 | Potter |
| 3,525,005 A | 8/1970 | Beyers |
| 3,648,090 A | 3/1972 | Voin |
| 3,812,928 A | 5/1974 | Rockwell |
| 3,914,859 A | 10/1975 | Pierson |
| 4,223,255 A | 9/1980 | Goldman et al. |
| 4,260,915 A | 4/1981 | Kawasumi |
| 4,480,208 A | 10/1984 | Logie et al. |
| 4,485,320 A | 11/1984 | Kawada et al. |
| 4,546,293 A | 10/1985 | Peterson et al. |
| 4,554,472 A | 11/1985 | Kumatani |
| 4,562,367 A | 12/1985 | Kumatani |
| 4,578,609 A | 3/1986 | McCarty |
| 4,651,066 A | 3/1987 | Gritter et al. |
| 4,694,213 A | 9/1987 | Gowda et al. |
| 4,912,353 A | 3/1990 | Kondo et al. |
| 4,920,295 A | 4/1990 | Holden et al. |
| 5,130,592 A | 7/1992 | Bitsch et al. |
| 5,233,254 A | 8/1993 | Fisher et al. |
| 5,390,409 A | 2/1995 | Courtney |
| 5,455,473 A | 10/1995 | Lipo et al. |
| 5,465,802 A | 11/1995 | Yang |
| 5,469,009 A | 11/1995 | Wakui et al. |
| 5,486,730 A | 1/1996 | Ludwig et al. |
| 5,570,503 A | 11/1996 | Stokes |

(Continued)

FOREIGN PATENT DOCUMENTS

EP 0 566 788 A1 4/1992

(Continued)

*Primary Examiner*—Thanh Lam
(74) *Attorney, Agent, or Firm*—Butzel Long

(57) ABSTRACT

A brushless permanent magnet electric machine with a fixed radial air gap is operated to a much higher speed than normal maximum speed by the reduction in effective magnet pole strength. Permanent magnets are supported on the inner surface of an axially movable cylindrical shell. A plurality of magnetic poles provided with wire coils are supported on a stationary cylindrical member cooperate with the permanent magnets on the axially movable cylindrical shell to either cause, or react to, rotation of the axially movable cylindrical shell. The axially movable cylindrical shell and cylindrical member are coaxial. The cylindrical shell is axially movable with respect to the cylindrical member.

18 Claims, 7 Drawing Sheets

U.S. PATENT DOCUMENTS

| | | |
|---|---|---|
| 5,627,419 A | 5/1997 | Miller |
| 5,677,605 A | 10/1997 | Cambier et al. |
| 5,723,928 A | 3/1998 | Imai et al. |
| 5,739,664 A | 4/1998 | Deng et al. |
| 5,821,710 A | 10/1998 | Masuzawa et al. |
| 5,834,874 A | 11/1998 | Krueger et al. |
| 5,894,902 A | 4/1999 | Cho |
| 5,918,360 A | 7/1999 | Forbes et al. |
| 5,920,127 A | 7/1999 | Damron et al. |
| 5,973,428 A | 10/1999 | Zakrocki et al. |
| 6,028,386 A | 2/2000 | Kech et al. |
| 6,057,622 A | 5/2000 | Hsu |
| 6,077,258 A | 6/2000 | Lange et al. |
| 6,133,669 A | 10/2000 | Tupper |
| 6,137,195 A | 10/2000 | Chitayat |
| 6,145,314 A | 11/2000 | Woollenweber et al. |
| 6,181,048 B1 | 1/2001 | Smith et al. |
| 6,191,513 B1 | 2/2001 | Chen et al. |
| 6,191,561 B1 | 2/2001 | Bartel |
| 6,194,802 B1 | 2/2001 | Rao |
| 6,229,240 B1 | 5/2001 | Kech et al. |
| 6,249,069 B1 | 6/2001 | Krueger |
| 6,278,206 B1 | 8/2001 | Yockey et al. |
| 6,321,863 B1 | 11/2001 | Vanjani |
| 6,328,123 B1 | 12/2001 | Nieman et al. |
| 6,329,736 B1 | 12/2001 | Bernauer et al. |
| 6,348,753 B1 | 2/2002 | Sakai et al. |
| 6,351,050 B1 | 2/2002 | Coles |
| 6,404,097 B1 | 6/2002 | Pullen |
| 6,429,611 B1 | 8/2002 | Li |
| 2002/0046891 A1 | 4/2002 | Honda et al. |
| 2002/0166737 A1 | 11/2002 | Chen |

FOREIGN PATENT DOCUMENTS

| | | |
|---|---|---|
| EP | 0 492 290 | 7/1992 |
| EP | 0 507 967 | 10/1992 |
| EP | 0 579 084 | 1/1994 |
| EP | 0 337 032 | 10/1999 |
| JP | 54-7508 | 1/1979 |
| JP | 5-116546 | 5/1993 |
| WO | WO 03/03543 | 1/2003 |
| WO | WO 03/077403 A1 | 9/2003 |

BRUSHLESS PERMANENT MAGNET WHEEL MOTOR WITH VARIABLE AXIAL ROTOR/STATOR ALIGNMENT

TECHNICAL FIELD

The present invention relates primarily to electric drive systems for motor vehicles. More particularly, the present invention relates to brushless permanent magnet wheel motor designs that are configured to be used as hub motors in motor vehicles and to brushless permanent magnet alternator designs that can be used in wind turbine generators systems and motors for marine craft. Even more particularly, the present invention relates to brushless permanent magnet motor and alternator designs that allow for variable axial rotor/stator or rotator/armature alignment.

BACKGROUND ART

In response to environmental concerns it has been the goal of the automobile industry to develop motor vehicles that use less fossil fuel. While the use of electric vehicles will completely eliminate the use of fossil fuels, there are a number of disadvantages associated with designs that incorporate electric motors into the drive systems of motor vehicles, including both fully electric vehicles and hybrid vehicles which utilize a combination of fossil fueled engines and electric motors.

Following conventional designs of combustion engine driven vehicles, electric vehicles and particularly hybrid vehicles typically include at least one (and sometimes two) drive axle which distributes kinetic energy from an electric motor to the vehicle wheels. In order to ensure smooth and accurate performance of such operations as transmitting the rotation of the motor to the wheels, varying the relative rates of rotation of laterally opposite wheels, thereby enabling the vehicle to turn a corner or for transferring rotational force from a wheel that looses traction, it is necessary to include power transmission devices such as reduction and differential gear systems and accessorial devices such as drive shafts, etc. for coupling the power transmission devices to the wheels.

The power transmission devices and accessorial devices entail not only additional weight, but also effect the efficiency of power transmission which increases a vehicle's energy consumption and decreases the driving range of the vehicle. It is widely known that fully electric vehicles inherently have limited driving ranges because of limitations on storage batteries, and that concerns about short driving ranges constitutes one of the major factors that prevents such vehicles from being readily accepted by the general public.

Direct-drive type motor wheels eliminate the use of reduction and differential gear systems and accessorial devices such as drive shafts, etc. and thereby decrease vehicle weight and improve efficiency. Direct-drive type motor wheels fall into two categories—those having wheels mechanically interlocked to the motor and those incorporating the motors into the wheels.

Direct-drive type motor wheels require electronic control systems to coordinate the operation of the individual motors. Control is however generally limited by the characteristics of the electric motors and generally involves merely varying the electrical energy supplied to the individual motors.

Conventional permanent magnet motors are capable of applying high output torques up to an rpm limit called the base speed. The base speed rpm is governed by the phenomena of permanent magnet motors building up "back-emf" electrical potentials as rotational speeds increase. The back-emf is governed by the magnetic gap flux density, number of winding turns, and rotational speed. As the rotational speed of a permanent magnet motor increases, the back-emf will build up until it equals the supplied voltage. Once the back-emf equals the supplied voltage, permanent magnet motors will not operate any faster. This back-emf rpm limiting characteristic protects permanent magnet motors from the over speed damage that is common with series wound electrical motors. The back-emf base speed characteristic that protects permanent magnet motors also tends to limit the dynamic rpm range.

In order to accelerate from rest or from low speeds, many electric vehicles have a fixed reduction drive ratio that is set for high torque. While such configurations provide the necessary high torque to overcome inertia, it results in a low base speed and a limited top speed. In addition to a low speed, constant torque operation, it is desirable for many motor vehicles to also have an upper range of constant power, where speed can increase with decreased torque requirements.

There are methods by which to operate a brushless permanent magnet motor or other motor type beyond the base speed. These methods can be broadly classified as either those using electrical means or those using mechanical means.

Methods of electrically enhancing speed or varying magnet flux include high current switching of additional phase coils or switching the way the phase coils are connected. The costs of such contactors and their contact wear tend to negate the advantages of a high durability brushless motor. Supplemental flux weakening coils have also been used to reduce stator flux and increase speed. This latter approach typically requires contactors and increases heating effects in the stator. Other methods can achieve higher speed operation by varying the waveform shape and pulse angle of the applied driving current or voltage.

Other known methods include the use of DC/DC amplifier circuitry to boost the supply voltage in order to achieve a higher motor speed. This method increases system costs and decreases reliability and efficiency. Such electrical approaches to increasing a motor's base speed are exemplified in U.S. Pat. No. 5,677,605 to Cambier et al., U.S. Pat. No. 5,739,664 to Deng et al. and U.S. Pat. No. 4,546,293 to Peterson et al.

Mechanical approaches to increasing a motor's base speed include configurations that vary the radial air gap between a tapered or conical rotor and stator. U.S. Pat. Nos. 829,975 and 1,194,645 to Lincoln disclose a conical rotor and shaft that is moved axially by a worm gear to adjust air gap and speed. U.S. Pat. No. 3,648,090 to Voin and U.S. Pat. No. 4,920,295 to Holden et al. each disclose a conical rotor in an alternator that is adjusted axially to vary air gap and the alternator output. U.S. Pat. No. 5,627,419 to Miller discloses a conical rotor that is moved axially to increase air gap and reduce magnetic drag on a flywheel energy storage system when the motor is not energized. In all of these patents, the rotor and stator remain engaged and changes in the magnetic air gap is achieved by small axial movements.

U.S. Pat. No. 3,250,976 to McEntire discloses motor stator coils of an AC induction motor that are moved axially between shorted and non-shorted portions of a dual rotor to vary speed. McEntire requires complex multiple lead screws or ball screws to effect stator movement and a double length rotor.

U.S. Pat. No. 5,821,710 to Masuzawa et al. discloses a magnet rotor that is split into two sections. For normal slow speed operation, the magnetic north and south poles of both rotor sections are aligned. As motor speed increases, centrifugal weights rotate one rotor section so the magnetic poles have increasing misalignment with speed. The magnetic pole misalignment causes a reduction in magnetic flux and back-emf, which allows the motor to run faster than normal base speed. This system is self contained, but requires a split rotor and the centrifugal apparatus to move the one rotor segment into misalignment. The strong repulsive forces of like magnet poles produce thrust to push the rotor segments apart. When the poles are misaligned, the attractive forces of unlike magnetic poles add to the centrifugal positioning force and override the springs used to restore the alignment position. These factors add to the complicated design and effect durability, and cost.

U.S. Pat. No. 6,194,802 to Rao discloses a pancake type motor that uses a fixed axial air gap. In this type of motor the axial gap is functionally equivalent to the radial gap in an internal cylindrical rotor motor design with a radial air gap. The individual magnet sectors in the rotor are mounted on spring loaded radial tracks. When the rotor rpm increases, centrifugal force causes the magnet sectors to extend radially, reducing the active area of magnet aligned with the stator coil and reducing the back-emf. This causes the motor to run faster than the base speed. Rao is similar to Masuzawa et al. and Holden et al. mentioned above in the centrifugal method of activation. The design of Rao requires extensive machining of the radial magnet tracks which increases costs and adds to the complexity. In addition, maintaining a sufficient level of balance of this magnet rotor is complicated by several factors. Even after the rotor is balanced with the magnets at their inboard position, as speed increases the position of the individual magnets is affected by difference in mass of the magnets, spring constants/rates, and sliding friction of the magnets along the tracks. Small variations in the resultant in the individual magnet positions would have a disastrous effect on the balance at high rotor speeds. These factors would necessarily adversely affect the ability to reduce back-emf of the motor and operate above the base speed.

U.S. Pat. Nos. 6,492,453 and 6,555,941 to Lawrence P. Zepp and Jerry W. Medlin discloses brushless permanent magnet motors (or alternators) with variable axial rotor/stator alignment to increase speed capability. These patents describe brushless permanent magnet electrical machines having a rotor that is provided with a plurality of permanent magnets at a peripheral surface thereof and which is coaxially aligned with a stator. The rotor is coupled a rotatable shaft and the assembly is provided with means for moving the rotor with respect to the stator along the rotatable shaft.

The present invention provides unique configurations of brushless permanent magnet motor and alternator designs that allow for variable axial rotor/stator or rotator/armature alignment and unique applications.

DISCLOSURE OF THE INVENTION

According to various features, characteristics and embodiments of the present invention which will become apparent as the description thereof proceeds, the present invention provides a brushless permanent magnet electrical machine which comprises:

a first cylindrical member having a central axis, an inner cylindrical surface and an outer cylindrical surface and a plurality of magnetic poles extending outward from the outer cylindrical surface of the first cylindrical member, the plurality of magnetic poles provided with wire coils around each of the plurality of magnetic poles;

a second cylindrical member having a central axis, an inner cylindrical surface and an outer cylindrical surface and a plurality of permanent magnets coupled to the inner cylindrical surface of the second cylindrical member, the second cylindrical member surrounding the first cylindrical member so that the plurality of magnet poles and the plurality of permanent magnets are adjacent and spaced apart from one another radially and the central axis of the second cylindrical member and the central axis of the first cylindrical member coincide and define a common central axis;

a rotatable shaft that is coaxial with the common axis; and means for moving the second cylindrical member with respect to the first cylindrical member along the common central axis.

According to the present invention, the brushless permanent magnet electrical machine is used in combination with a motor vehicle, a power generating system including a wind power generator/alternator and water craft.

The present invention further provides a motor vehicle comprising a plurality of wheels, at least one of said plurality of wheels coupled to a hub motor that comprises:

a stator having a central axis, an inner cylindrical surface and an outer cylindrical surface and a plurality of magnetic poles extending outward from the outer cylindrical surface of the stator, the plurality of magnetic poles provided with wire coils around each of the plurality of magnetic poles;

a rotator having a central axis, an inner cylindrical surface and an outer cylindrical surface and a plurality of permanent magnets coupled to the inner cylindrical surface of the rotator, the rotator surrounding the stator so that the plurality of magnet poles and the plurality of permanent magnets are adjacent and spaced apart from one another radially and the central axis of the rotator and the central axis of the stator coincide and define a common central axis;

a rotatable shaft that is coaxial with the common axis; and means for moving the rotor with respect to the stator along the common central axis.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to brushless permanent magnet wheel motor designs that are configured to be used as hub motors in motor vehicles and to brushless permanent magnet alternator designs that can be used in wind turbine generators systems and motors for water craft. Even more particularly, the present invention relates to brushless permanent magnet motor and alternator designs that allow for variable axial rotor/stator or rotator/armature alignment.

The present invention provides separate brushless permanent magnet motors for one or more wheels of a wheeled vehicle. Each wheel motor according to the present invention includes a motor shaft which are is coupled to separate wheel hub, wheel rim or other structure that supports a tire thereon for rotation therewith.

The motor shaft is supported within a stator by housing structure for rotational movement within the stator and is coupled to the stator so as to prevent relative axial movement between the motor shaft and the stator. The stator comprises a stator ring which includes or supports a plurality of stator teeth along an outer periphery of the stator ring. The stator teeth have convex outer surfaces, are evenly spaced along the periphery of the stator ring, and are provided with wire coils that are wound around the stator teeth and selectively energized to create the magnetic forces that cause the motor shaft to rotate.

The motor shaft supports a rotor shell for rotational movement with respect to the stator. The rotor shell includes a plurality of permanent magnets positioned along an inner surface which face the convex outer surfaces of the stator teeth, so that when the wire coils provided around the stator teeth are selectively energized to create magnetic fields that attract and/or repel the permanent magnets on the inner surface of the rotor shell, the rotor shell rotates about the stator ring.

The rotor shell is coupled to the motor shaft by a constant velocity bearing which allows the rotor shell to move axially with respect to the motor shaft and allows the stator to transmit rotational motion to the motor shaft.

The constant velocity bearing allows axial displacement of the rotor shell with respect to the stator ring which is held in a stationary or fixed position with respect to the rotor, with the motor shaft being axially fixed but rotatable with respect to the stator and rotatably fixed but axially movable with respect to the rotor. As the rotor shell is offset into greater misalignment with the stator ring, the magnet flux on the stator field coils is reduced, reducing the back emf that limits rotational speed. With the rotor shell misaligned, the motor operates in constant power mode, where available torque is inversely proportional to speed. The rotor shell can be moved axially by a hydraulic, electromechanical, manual, or other actuator means connected to a lever or other means.

Figure 1:
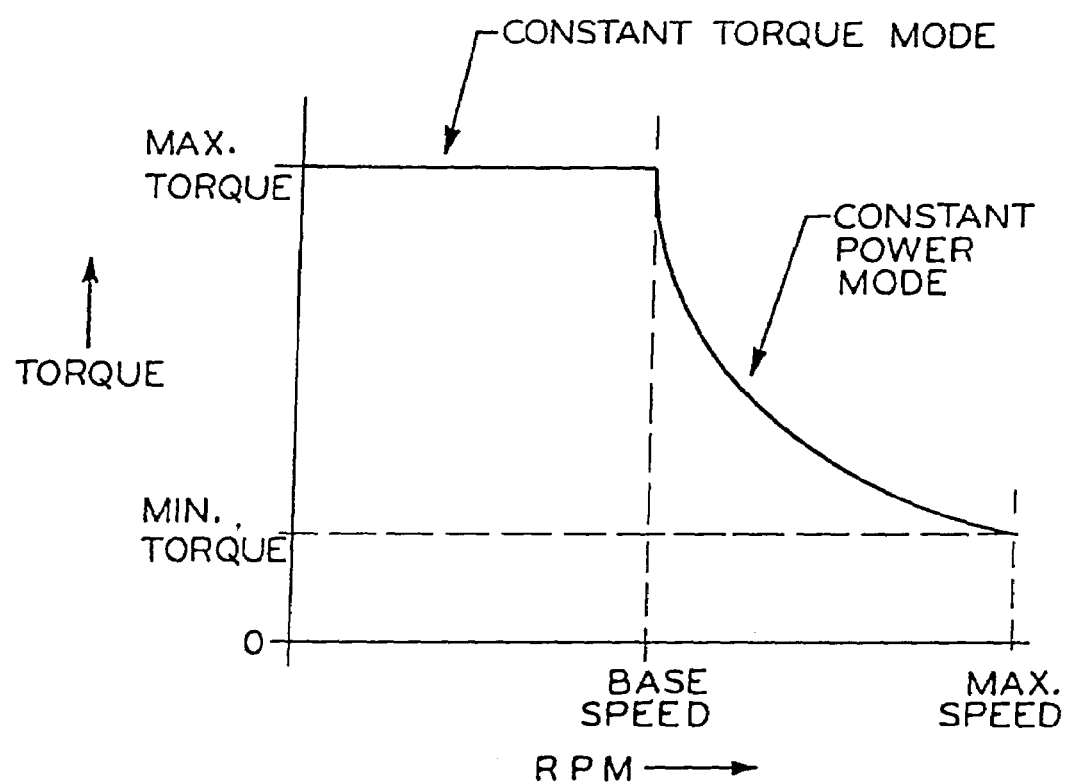
FIG. 1 is a graph depicting the relationship between speed and torque for a typical air gap motor of the present invention.

FIG. 1 is a graph depicting the relationship between speed and torque for a typical air gap motor of the present invention. In FIG. 1 the motor torque, which increases through a minimum torque up to a maximum torque for a given motor, is plotted against motor speed. The minimum torque is the torque required to drive the motor when the back emf is theoretically reduced to zero. The motor's base speed, which as discussed above is that speed at which back emf equals applied voltage, is shown on the horizontal axis of the graph in FIG. 1. Below the motor base speed a constant torque mode is shown. Above the base speed, and up to the motor maximum speed, a constant power mode is shown. In this latter mode, as the torque is lowered current increases resulting in a speed increase. The constant power mode is the motor speed addressed in the present invention.

Figure 2:
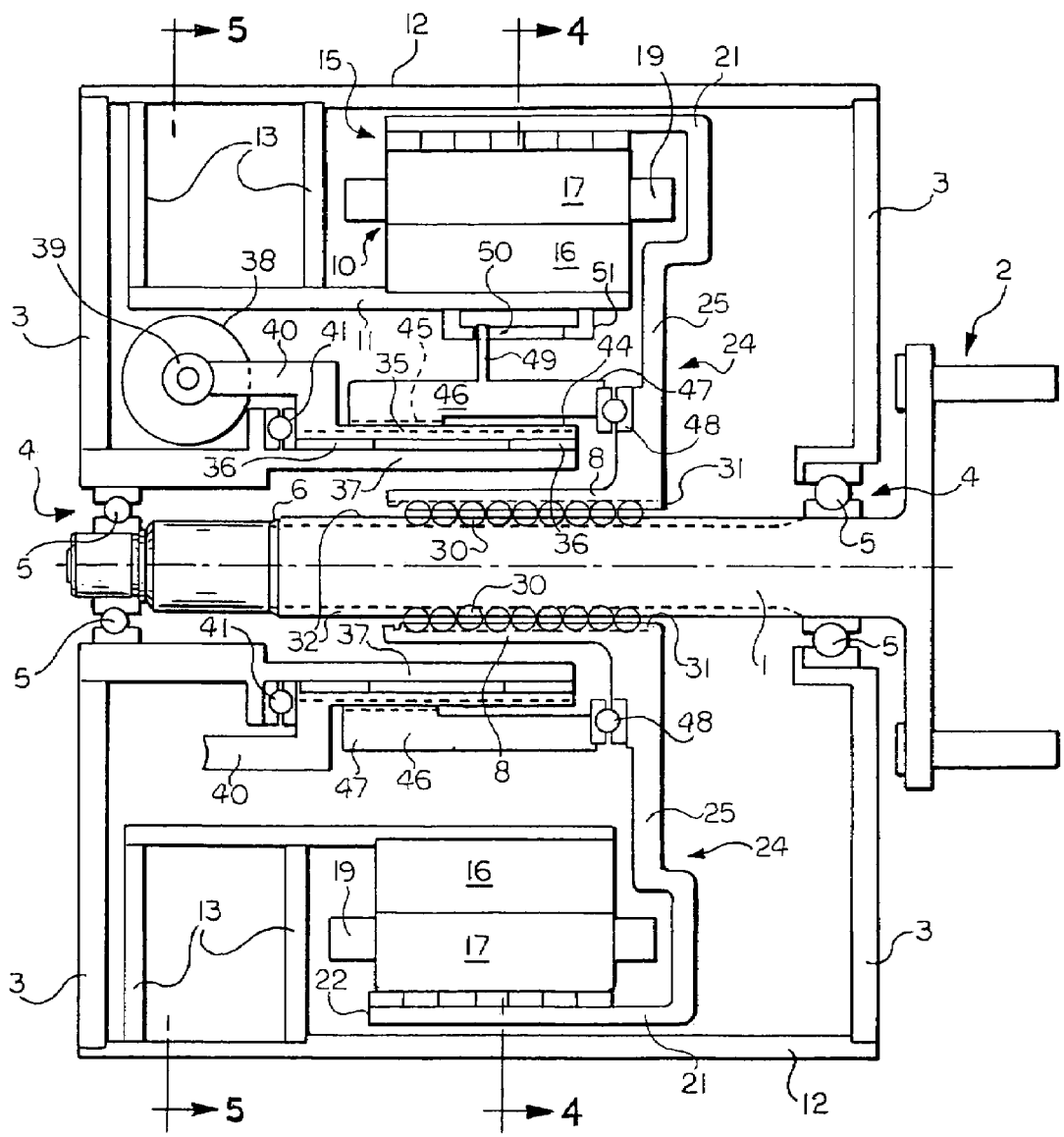
FIG. 2 is a cross-sectional view of permanent magnet electric motor according to one embodiment of the present invention in which the rotor is fully engaged with the stator.

FIG. 2 is a cross-sectional view of permanent magnet electric motor according to one embodiment of the present invention in which the rotor is fully engaged with the stator. The permanent magnet motor includes a motor shaft 1 that is coupled at one end to a structure identified by reference numeral 2 that represents a hub, wheel rim or other structure that supports a tire thereon for rotation therewith. The motor shaft 1 is supported in a housing 3 by bearing assemblies 4 which include radial ball bearings 5. Other conventional bearing assemblies can also be used. The motor shaft 1 is supported in a manner that allows the motor shaft 1 to rotate within the housing 3, but restricts axial movement of the motor shaft 1 within the housing 3.

The motor shaft 1 depicted in FIG. 2 includes a stepped portion 6 which, is configured to allow ball bearings 30 to be placed between the motor shaft 1 and rotor pedestal collar 8 as discussed in more detail below.

The stator 10 is supported in housing 3 on a cylindrical support 11 that is coupled to the outer wall 12 of housing 3 by one or more annular braces 13 which support the stator 10 so that there is an annular space between the stator 10 and the outer wall 12 of the housing 3 in which space the rotor 15 can be movable positioned.

The stator 10 includes a stator ring 16 that includes or supports a plurality of stator teeth 17 along an outer periphery of the stator ring 16. The stator teeth 17 have convex outer surfaces 18 (See FIG. 4), are evenly spaced along the periphery of the stator ring, and are provided with wire coils 19 that are wound around the stator teeth 17 and selectively energized to create the magnetic forces that cause the motor shaft 1 to rotate.

The rotor 15 comprises an annular outer shell 21 having a plurality of permanent magnets 22 that are attached to an inner surface of the annular outer shell 21 so as to be opposed to the stator teeth 17. The permanent magnets 22 can be attached to the inner surface of the annular outer shell 21 using suitable adhesives, cements, glues, epoxies, etc. The surfaces 23 (See FIG. 4) of the permanent magnets 22 which face the convex outer surfaces 18 of the stator teeth 17 are concave to be complementarily shaped to the convex outer surfaces 18 of the stator teeth 17. The annular outer shell 21 of the rotor 15 is coupled to rotor pedestal 24 and positioned so that there is a minimum gap between the outer surfaces 18 of the stator teeth 17 and the inner surfaces 23 of the permanent magnets 22.

Rotor pedestal 24 includes pedestal collar 8 and a radially extending portion 25 that supports the annular outer shell 21 of the rotor 15. The radially extending portion 25 can comprise a continuous disc-shaped structure or a plurality of radially extending spokes. In the embodiment of the invention depicted in FIGS. 2–6 the radially extending portion 25 of the rotor pedestal 24 is a continuous disc shaped structure and the annular outer shell 21 of the rotor 15 is integrally formed on an outer portion of the radially extending portion 25 of the rotor pedestal 24. It is noted that in FIGS. 2–6 the radially extending portion 25 of the rotor pedestal 24 is configured to provide any necessary clearance for wire coils 19 that are wound around the stator teeth 17.

The rotor pedestal 24 which supports the rotor 15 is coupled to motor shaft 1 by a plurality of ball bearings 30. The ball bearings 30 are contained within a plurality of axial grooves 31 that are provided on an inner surface of the pedestal collar 8. The ends of grooves 31 are blocked by retaining rings (not shown) or other structural elements to prevent the ball bearings 30 from coming out of grooves 31. The ball bearings 30 are allowed to move axially in a plurality of axial grooves 32 that are formed in the outer surface of the motor shaft 1. Ball bearings 30 couple motor shaft 1 and pedestal collar 8 together to provide a constant velocity linear bearing between the motor shaft 1 and the rotor 15. The ball bearings 30 can be inserted within opposed grooves 31 and 32 during assembly by positioning motor shaft 1 so that the stepped portion 6 of motor shaft 1 is aligned within pedestal collar 8.

The constant velocity linear bearing allows the rotor 15 to be moved axially with respect to stator 10 by moving the pedestal collar 8 axially along the motor shaft 1. Movement of the pedestal collar 8 along motor shaft 1 can be accomplished by means of an actuator mechanism.

The actuator mechanism in FIG. 2 includes a hollow cylindrical lead screw 35 that is rotatably supported by bearings 36 on an annular central housing portion 37 of the housing 3. The hollow cylindrical lead screw 35 is rotationally driven by a reversible motor 38 that rotates a gear element 39 provided on a shaft of the reversible motor 38. The gear element 39, such as a worm wheel, cooperatively engages and rotates a cylindrical gear element 40, such as a worm gear, that is coupled to one end of the hollow cylindrical lead screw 35. A thrust bearing 41 is provided adjacent the end of the hollow cylindrical lead screw 35 and cooperates with bearings 36 to facilitate the rotation of hollow cylindrical lead screw 35 with respect to the annular central housing portion 37.

The inner surface of the hollow cylindrical lead screw 35 is configured to cooperate with bearings, e.g. needle bearings, to allow hollow cylindrical lead screw 35 to rotate about annular central housing portion 37. The outer surface of hollow cylindrical lead screw 35 includes exterior threads 44 (as shown in dashed lines). The exterior threads 44 formed on the outer surface of hollow cylindrical lead screw 35 cooperate with interior threads 45 (as shown in dashed lines) formed on an inner surface of a cylindrical shift sleeve 46 that is threadedly coupled to hollow cylindrical lead screw 35. The cylindrical shift sleeve 46 includes a forward end 47 that is coupled to a portion of rotor pedestal 24 by a thrust bearing 48. The cylindrical shift sleeve 46 also includes at least one anti-rotation pin 49 that is received a slot 50 provided in a bracket 51 that is fixed to a non-rotating portion of the housing 1, such as cylindrical support 11.

In operation, reversible motor 38 is activated to rotate cylindrical lead screw 35. The cooperation of the exterior threads 44 formed on the outer surface of hollow cylindrical lead screw 35 and the interior threads 45 formed on an inner surface of a cylindrical shift sleeve 46 (and anti-rotation pin 49) cause the cylindrical shift sleeve 46 to move axially along the hollow cylindrical lead screw 35. Rotation of reversible motor 38 in one direction causes the cylindrical shift sleeve 46 to move axially along the hollow cylindrical lead screw 35 in one direction, and rotation of reversible motor 38 in the opposite direction causes the cylindrical shift sleeve 46 to move axially along the hollow cylindrical lead screw 35 in an opposite direction.

As the cylindrical shift sleeve 46 is moved axially along hollow cylindrical lead screw 35 in a forward direction, cylindrical shift sleeve 46 pushes the rotor pedestal 24 so that pedestal collar 8 moves axially along motor shaft 1 in that same direction. At the same time, rotor 15 moves axially with respect to stator 10 in a corresponding direction. When cylindrical shift sleeve 46 is moved axially along hollow cylindrical lead screw 35 in the opposite direction, magnetic attraction between the stator 10 and rotor 15 causes pedestal collar 8 to also move axially along motor shaft 1 in the opposite direction.

In FIG. 2, rotor 15 is fully engaged with the stator 10. In this configuration the motor will produce a maximum torque but will have a limited base speed.

Figure 3:
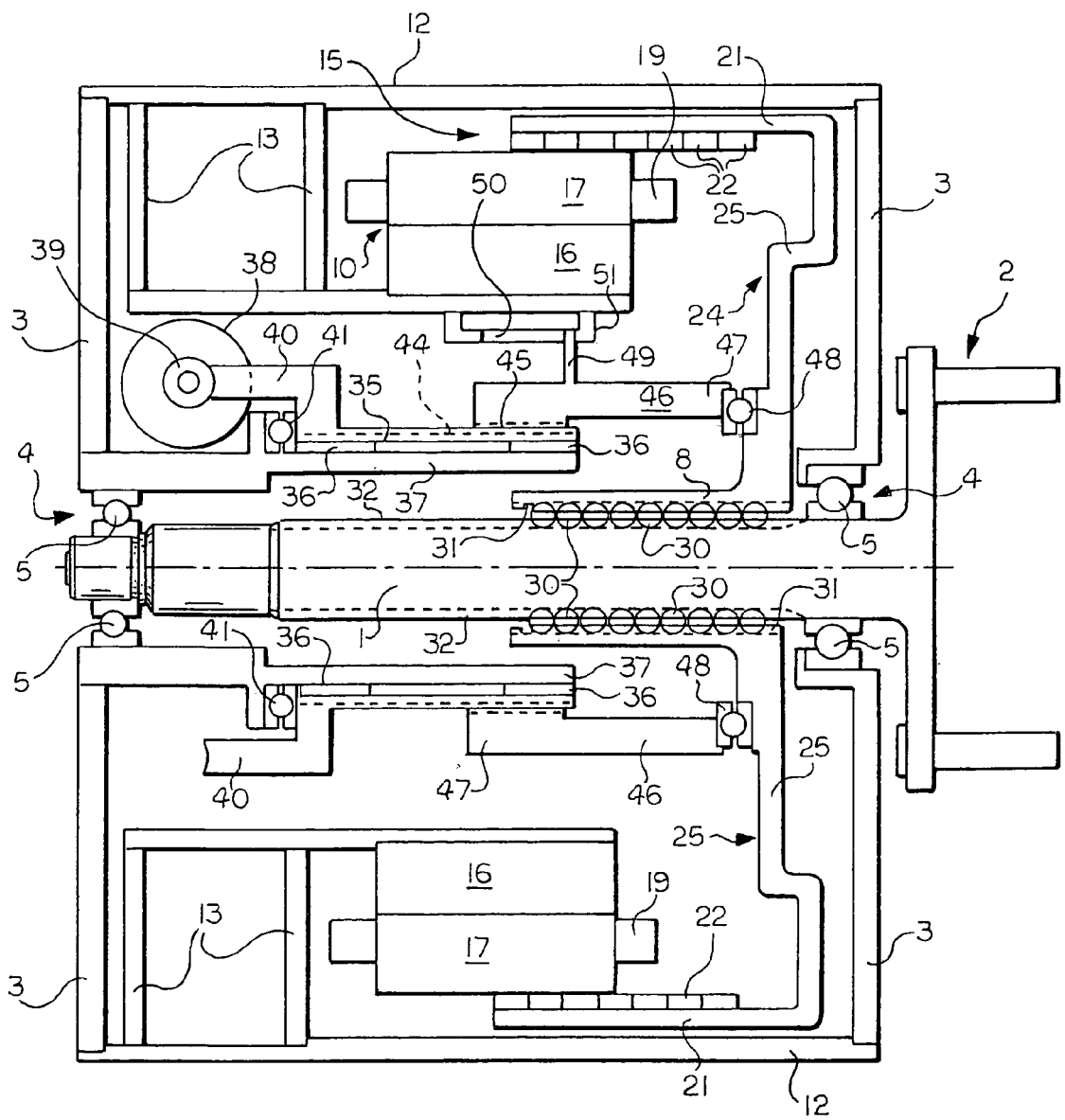
FIG. 3 is a cross-sectional view the permanent magnet electric motor of FIG. 2 in which the rotor is about 50% disengaged with the stator.

FIG. 3 is a cross-sectional view of permanent magnet electric motor according to one embodiment of the present invention in which the rotor is about 50% disengaged with the stator. A comparison between FIGS. 2 and 3 reveals how the cylindrical shift sleeve 46 moves axially with respect to the hollow cylindrical lead screw 35, while the pedestal collar 8 moves axially with respect to the motor shaft 1 while the rotor 15 moves axially with respect to the stator 10. In the configuration depicted in FIG. 3 the motor will produce a lower torque than in the configuration depicted in FIG. 2, but will have a higher base speed.

Figure 4:
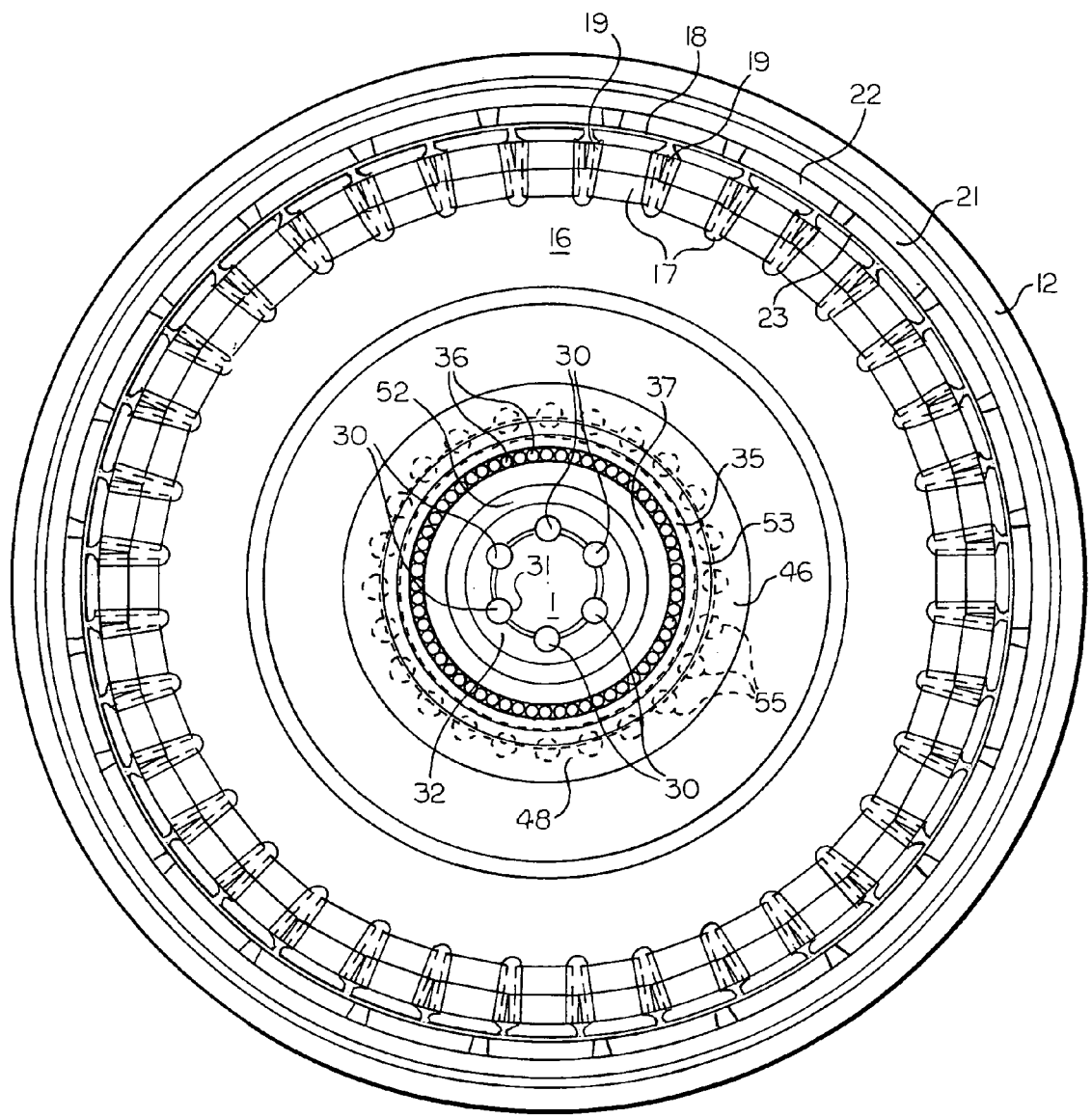
FIG. 4 is a cross-sectional end view of a stator, rotor and constant velocity bearing taken along section line IV—IV in FIG. 2.

FIG. 4 is a cross-sectional end view of a stator, rotor and constant velocity bearing taken along section line IV—IV in FIG. 2. FIG. 4 depicts how ball bearings 30 are received between grooves 31 formed in the outer surface of the motor shaft 1 and grooves 32 formed in the inner surface of the pedestal collar 8. The grooves/bearings are evening spaced about the motor shaft 1 and can include fewer or more groups of grooves/bearings than illustrated as desired.

An annular gap or space 52 is shown between pedestal collar 8 and annular central housing portion 37 of the housing 1. A plurality of needle bearings 36 are provided between hollow cylindrical lead screw 35 and annular central housing portion 37 as discussed above. Another small annular gap or space 53 is shown which is between the forward end 47 of cylindrical shift sleeve 46 and pedestal collar in FIG. 2.

In FIG. 4 cylindrical shift sleeve 46 is shown as contacting thrust bearing 48 which includes a plurality of bearing elements 55 that are arranged in a circular pattern. The radially extending portion 25 of rotor pedestal 24 extends radially outwardly and supports stator ring 16 which can be formed from a plurality of laminations that are stacked and secured together in known manners. Stator teeth 17 having convex outer surfaces 18 are secured in stator ring 16 and surrounded by wire coils 19. Permanent magnets 22 are supported by rotor shell 21 and have inner convex surfaces 23 which face the convex outer surfaces 18 of the stator teeth 17.

Figure 5:
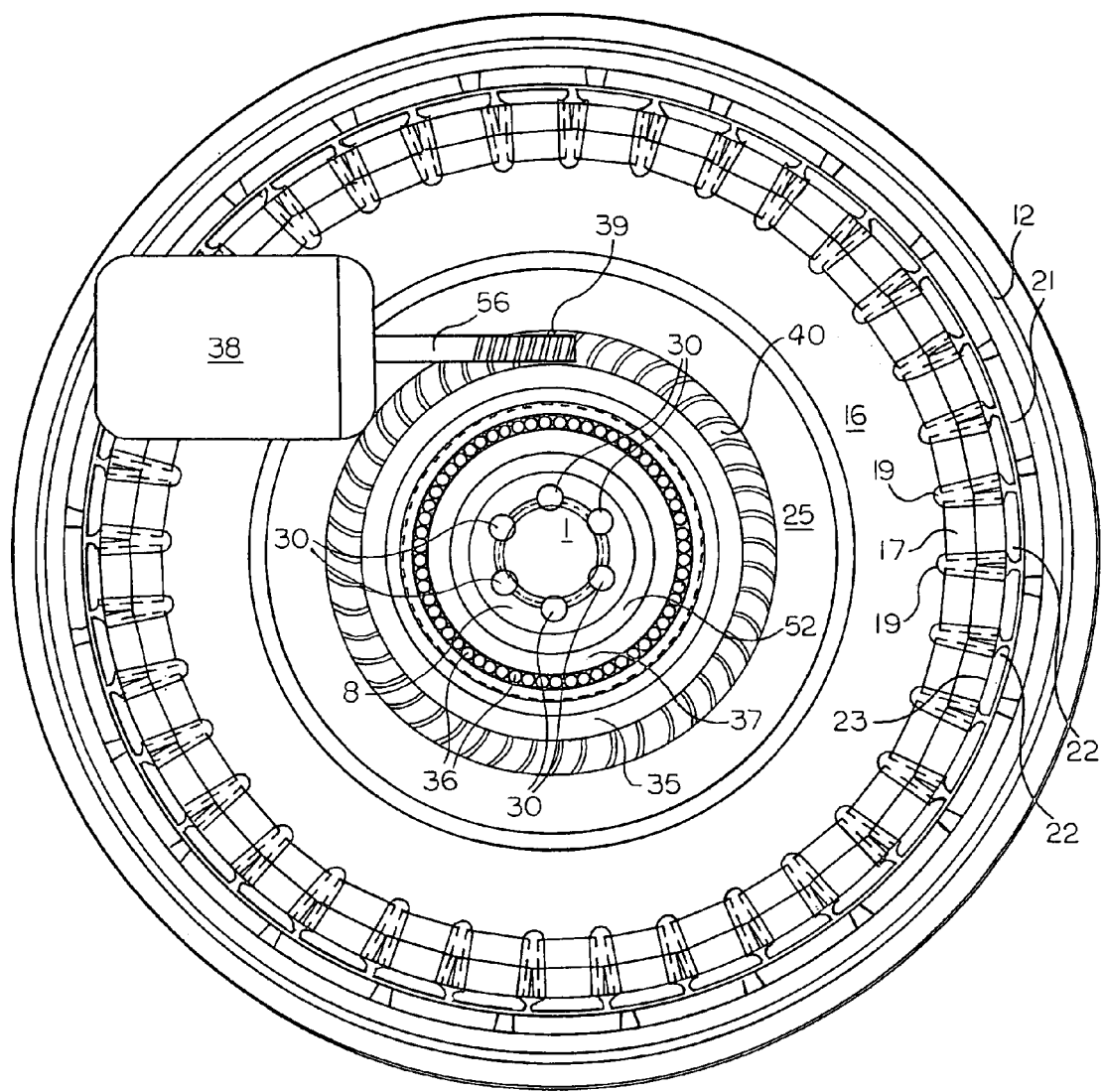
FIG. 5 is a cross-sectional end view of a stator, rotor and constant velocity bearing taken along section line V—V in FIG. 2.

FIG. 5 is a cross-sectional end view of a stator, rotor and constant velocity bearing taken along section line V—V in FIG. 2. FIG. 5 depicts reversible motor 38 as having a shaft 56 that is provided with a gear element 39. The gear element 39 can comprise gear teeth formed in the shaft or a separate gear element coupled to the shaft. The gear element 39 of reversible motor 38 is aligned and configured to cooperate with cylindrical gear element 40, such as a worm gear, that is coupled to one end of the hollow cylindrical lead screw 35. Operation of the motor is described able.

Figure 6:
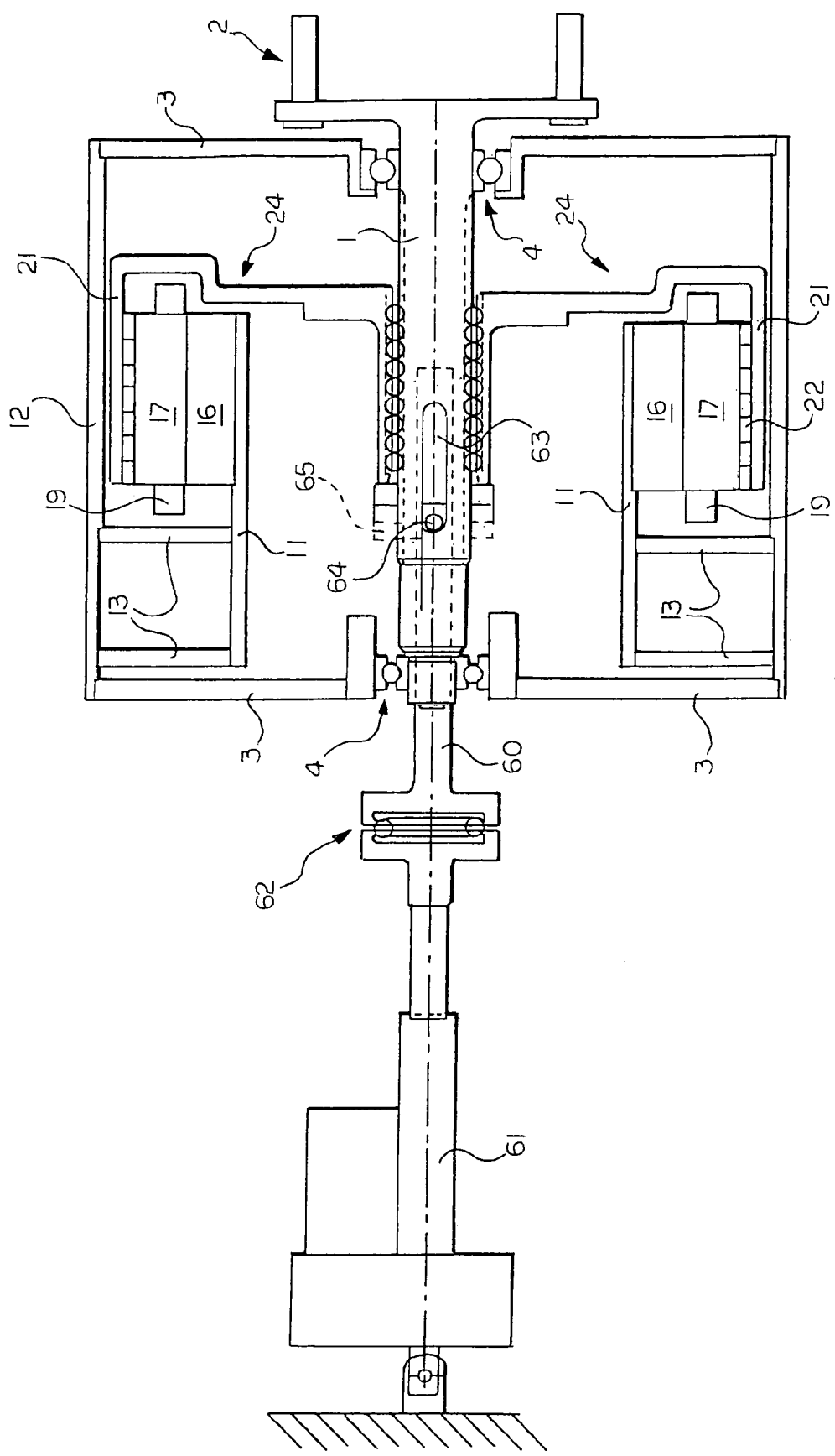
FIG. 6 according to another embodiment of the present invention in which the rotor is fully engaged with the stator.

FIG. 6 according to another embodiment of the present invention in which the rotor is fully engaged with the stator. The embodiment of the invention in FIG. 6 includes a different means for moving the rotor with respect to the stator. In FIG. 6 the end of motor shaft 1 is hollow and receives pushrod 60 therein. Pushrod 60 is coupled to hydraulic or pneumatic actuator 61 via a thrust bearing 62 which allows pushrod 60 to rotate with motor shaft 1 and actuator 61 to move axially without rotating. The hollow portion of the motor shaft 1 includes a slot 63 in at least one side thereof through which a cross pin 64 can be inserted and coupled to a shift collar that is attached to or part of the pedestal collar 8. In FIG. 6 the rotor 15 is fully engaged with the stator 10.

Figure 7:
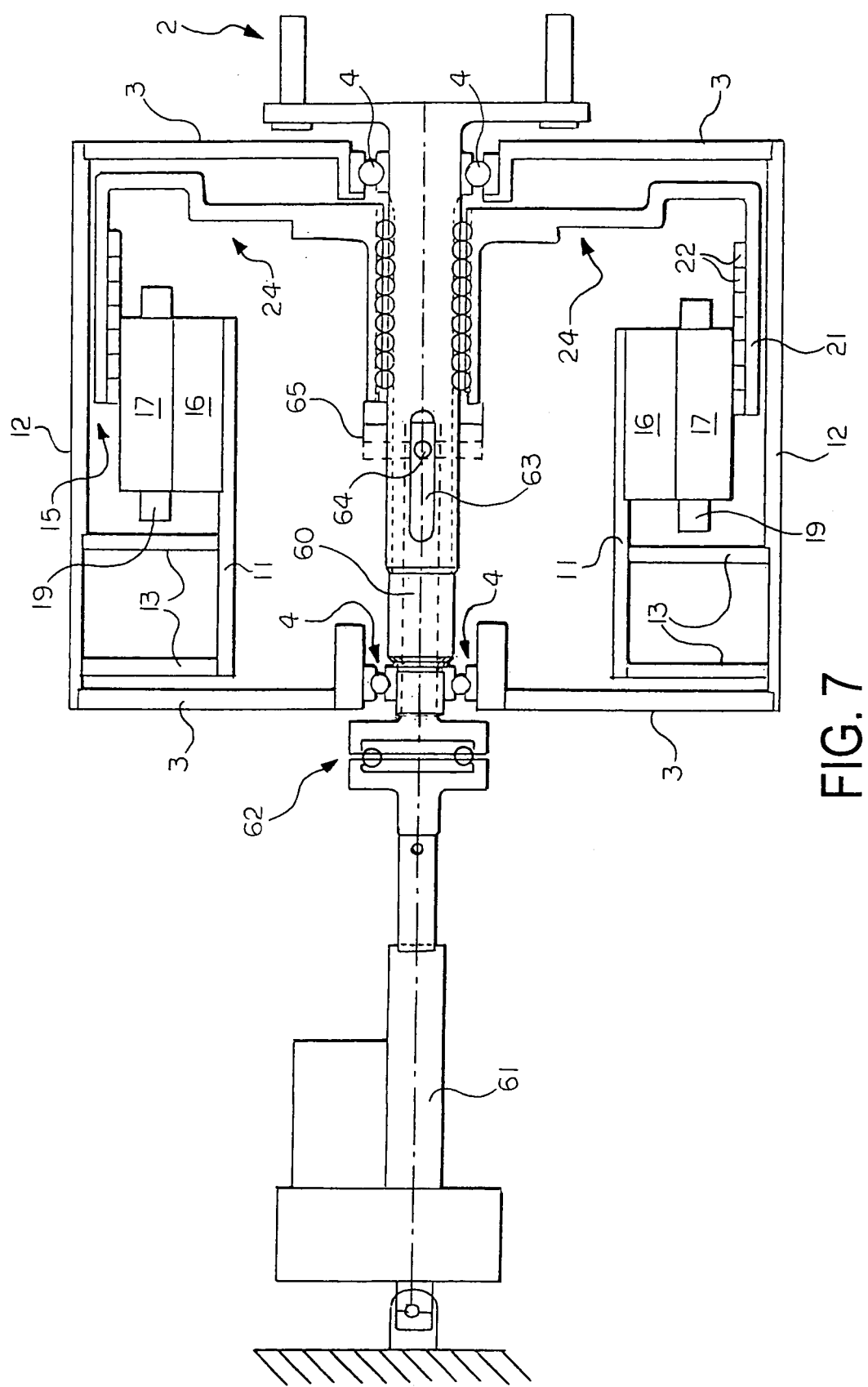
FIG. 7 is a cross-sectional view the permanent magnet electric motor of FIG. 6 in which the rotor is about 50% disengaged with the stator.

FIG. 7 is a cross-sectional view the permanent magnet electric motor of FIG. 6 in which the rotor 15 is about 50% disengaged with the stator 10.

The actuator used in the embodiment of the invention depicted in FIGS. 6 and 7 can be any type of linear actuator including a threaded screw driven shaft, a pinion and gear assembly, a cable system, sliding actuator, etc.

In order to accurately control the position of the rotor with respect to the stator, a linear position encoder can be incorporated into the motors of the present invention at any convenient location where they can be used to detect the axial position of the rotor or any axially moveable portion of the motor constructions.

It is noted that the unique configuration of the permanent magnet motor of the present invention which includes an outer rotor shell that rotates and an inner stator that does not rotate maximizes the amount of torque for the overall size of the motor. In addition, by providing the mechanism to move the rotor axially with respect to the stator, the motors of the present invention are particularly useful for applications such as wheel hub motors as discussed above and also wind mill and wind driven power generators such as wind turbine generators and marine vehicles including water surface vehicles and submersible vehicles. In such applications being able to vary the motor/generator torque allows for overcoming inertia and thereafter adjusting the torque for higher operational speeds. For wind mill and wind driven power generators the ability to provide a reduction in torque at start-up enhances the ability to affect start-up at low wind speeds and the ability to increase torque after start-up allows for increased power generation. For wind mill and wind driven power generators the configuration of the motors depicted in the various figures is the same with a propeller coupled to the motor shafts rather than a vehicle wheel and the rotation of the rotor by the propeller will generate electrical power in a known manner. For marine vehicles the configuration of the motors depicted in the various figures is the same with a propeller coupled to the motor shafts rather than a vehicle wheel.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A brushless permanent magnet electrical machine which comprises:
    a first cylindrical member having a central axis, an inner cylindrical surface and an outer cylindrical surface and a plurality of magnetic poles extending outward from the outer cylindrical surface of the first cylindrical member, the plurality of magnetic poles provided with wire coils around each of the plurality of magnetic poles;
    a second cylindrical member having a central axis, an inner cylindrical surface and an outer cylindrical surface and a plurality of permanent magnets coupled to the inner cylindrical surface of the second cylindrical member, the second cylindrical member surrounding the first cylindrical member so that the plurality of magnet poles and the plurality of permanent magnets are adjacent and spaced apart from one another radially and the central axis of the second cylindrical member and the central axis of the first cylindrical member coincide and define a common central axis;
    a rotatable shaft that is coaxial with the common axis; and
    means for moving the second cylindrical member with respect to the first cylindrical member axially along the common central axis.

2. A brushless permanent magnet electrical machine according to claim 1, further comprising a housing that houses the first and second cylindrical members, the rotatable shaft being rotatably coupled to the housing the first cylindrical member being held in a fixed position in the housing and the second cylindrical member being rotatable about the common central axis within the housing and axially movable within the housing.

3. A brushless permanent magnet electrical machine according to claim 2, wherein the second cylindrical member is coupled to the rotatable shaft by a constant velocity linear bearing.

4. A brushless permanent magnet electrical machine according to claim 1, wherein the means for moving the second cylindrical member with respect to the first cylindrical member comprises coacting threaded members including an axially fixed threaded member that is reversibly rotated and an axially movable threaded member that is prevented from rotating.

5. A brushless permanent magnet electrical machine according to claim 4, further including a motor for rotating the axially fixed threaded member that is reversibly rotated.

6. A brushless permanent magnet electrical machine according to claim 1, wherein the first cylindrical member comprises a stator and the permanent magnet electrical machine comprises a motor.

7. A brushless permanent magnet electrical machine according to claim 1, wherein the permanent magnet electrical machine comprises one of a generator and an alternator.

8. A brushless permanent magnet electrical machine according to claim 1 in combination with a vehicle in which combination the brushless permanent magnet electrical machine drives the vehicle.

9. The combination of claim 8, wherein the vehicle includes a plurality of wheels and a brushless permanent magnet electrical machine according to claim 1 coupled to at least one of the plurality of wheels.

10. The combination of claim 9, comprising a brushless permanent magnet electrical machine coupled separately to each of the plurality of wheels.

11. A brushless permanent magnet electrical machine according to claim 1 in combination with a power generating system in which combination the brushless permanent magnet electrical machine comprises one of a generator and an alternator.

12. The combination of claim 11, wherein the power generating system comprises a wind powered system.

13. A brushless permanent magnet electrical machine according to claim 1 in combination with a marine craft, in which combination the rotatable shaft of the brushless permanent magnet electrical machine is coupled to means to propel the marine craft.

14. The combination of claim 13, wherein the means to propel the marine craft comprises a propeller.

15. The combination of claim 14, wherein the marine craft comprises a submersible marine craft.

16. A motor vehicle comprising a plurality of wheels, at least one of said plurality of wheels coupled to a hub motor that comprises:
- a stator having a central axis, an inner cylindrical surface and an outer cylindrical surface and a plurality of magnetic poles extending outward from the outer cylindrical surface of the stator, the plurality of magnetic poles provided with wire coils around each of the plurality of magnetic poles;
- a rotator having a central axis, an inner cylindrical surface and an outer cylindrical surface and a plurality of permanent magnets coupled to the inner cylindrical surface of the rotator, the rotator surrounding the stator so that the plurality of magnet poles and the plurality of permanent magnets are adjacent and spaced apart from one another radially and the central axis of the rotor and the central axis of the stator coincide and define a common central axis;
- a rotatable shaft that is coaxial with the common axis; and
- means for moving the rotor with respect to the stator axially along the common central axis.

17. A motor vehicle according to claim 16, comprising a plurality of the hub motors and wherein two or more of the plurality of wheels are coupled to a separate ones of the plurality of hub motors.

18. A motor vehicle according to claim 16, further comprising a housing that houses the stator and rotor, the rotatable shaft being rotatably coupled to the housing, the stator being held in a fixed position in the housing and the rotor being rotatable about the common central axis within the housing and axially movable within the housing.

* * * * *